United States Patent
Muharsky et al.

(10) Patent No.: US 8,561,021 B2
(45) Date of Patent: Oct. 15, 2013

(54) TEST CODE QUALITATIVE EVALUATION

(75) Inventors: Joe Allan Muharsky, Duvall, WA (US); Ryan Vogrinec, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 794 days.

(21) Appl. No.: 12/701,628

(22) Filed: Feb. 8, 2010

(65) Prior Publication Data

US 2011/0197176 A1 Aug. 11, 2011

(51) Int. Cl.
G06F 9/44 (2006.01)

(52) U.S. Cl.
USPC ........... 717/113; 717/114; 717/120; 717/121; 717/124

(58) Field of Classification Search
USPC .......................... 717/113, 114, 120, 121, 124
See application file for complete search history.

(56) References Cited

U.S. PATENT DOCUMENTS

| | | | |
|---|---|---|---|
| 5,778,169 A * | 7/1998 | Reinhardt | 714/38.1 |
| 6,907,378 B2 | 6/2005 | Stirrat et al. | |
| 7,003,766 B1 | 2/2006 | Hong | |
| 7,603,660 B2 | 10/2009 | Davia et al. | |
| 7,801,158 B2 * | 9/2010 | Voit et al. | 370/401 |
| 8,090,567 B1 * | 1/2012 | Donlin | 703/13 |
| 8,117,591 B1 * | 2/2012 | Michelsen | 717/109 |
| 2002/0151038 A1 * | 10/2002 | Raghukumar et al. | 435/254.1 |
| 2005/0166094 A1 * | 7/2005 | Blackwell et al. | 714/38 |
| 2006/0098670 A1 * | 5/2006 | Voit et al. | 370/401 |
| 2007/0168336 A1 * | 7/2007 | Ransil et al. | 707/3 |
| 2009/0254887 A1 | 10/2009 | Rossi et al. | |
| 2009/0265694 A1 | 10/2009 | Bakowski | |
| 2010/0004947 A1 * | 1/2010 | Nadeau et al. | 705/3 |
| 2010/0293525 A1 * | 11/2010 | Cifra | 717/109 |
| 2010/0293528 A1 * | 11/2010 | Austin et al. | 717/113 |

OTHER PUBLICATIONS

Cornett Steve, "Code Coverage Analysis", Retrieved at<<http://www.bullseye.com/coverage.html>>, 1996-2008, pp. 1-13.
Glover Andrew, "In Pursuit of Code Quality: Don't be Fooled by the Coverage Report", Retrieved at<<http://www.ibm.com/developerworks/java/library/j-cq01316/index.html>>, Jan. 31, 2006, pp. 1-19.
"A Framework for Software Product Line Practice, Version 5.0", Retrieved at<<http://www.sei.cmu.edu/productlines/frame_report/testing.htm>>, Dec. 14, 2009, pp. 1-12.

(Continued)

*Primary Examiner* — Idriss N Alrobaye
*Assistant Examiner* — Getente A Yimer
(74) *Attorney, Agent, or Firm* — Rau Patents, LLC (57) ABSTRACT

A test environment may include qualitative evaluations of the test code used to test application code. Several qualitative evaluations may be determined from analysis of test code in compiled or source form, including evaluating descriptive assertions made by the test code, dependency evaluations, cyclomatic complexity evaluations, return value assertions, mutable parameter assertions, and test effectiveness history. The qualitative evaluations may also include analysis of the test code in relation to the application code, including exception capturing, boundary conditions, assertions for returned values, and other evaluations. The test code evaluations may be presented in a user interface along with the test code and may be used to manage testing progress of an application. The test code evaluations may be integrated into a code development application with a graphical user interface.

16 Claims, 5 Drawing Sheets

(56) References Cited

OTHER PUBLICATIONS

Layman, et al. "Iterative Identification of Fault-prone Binaries Using In-Process Metrics", Retrieved at <<http://lucas.ezzoterik.com/papers/LKN08.pdf>>, ESEM'08, Oct. 9-10, 2008, Kaiserslautern, Germany, ACM, pp. 7.

Nagappan, et al. "Early Estimation of Software Quality Using In-Process Testing Metrics: A Controlled Case Study".

Bhat, et al. "Building Scalable Failure-proneness Models Using Complexity Metrics for Large Scale Software Systems", Retrieved at<<http://ieeexplore.ieee.org/stamp/stamp.jsp?tp=&isnumber=&arnumber=4137438>>, XIII Asia Pacific Software Engineering Conference (APSEC'06), 2006 IEEE, pp. 6.

Nagappan, et al. "Using Historical In-Process and Product Metrics for Early Estimation of Software Failures", Retrieved at<<http://research.microsoft.com/en-us/projects/esm/nagappann-historical.pdf>>, pp. 10.

Kudrjavets, et al. "Assessing the Relationship between Software Assertions and Faults: An Empirical Investigation", Retrieved at<<http://research.microsoft.com/pubs/70290/tr-2006-54.pdf>>, pp. 17.

* cited by examiner

TEST CODE QUALITATIVE EVALUATION

BACKGROUND

Application code is source code that may be part of a computer application. Application code is often used as part of a software product and may be compiled and shipped as executable computer code.

Test code may be used to test the application code. Test code, in general, does not get shipped to a customer or end user as application code may be, but may be used to exercise the application code to identify bugs in the application code. A bug may be any operation performed by the application code that is undesirable. Some bugs may be severe, such as causing the application to crash or cease operations, while other bugs may be minor, such as inelegantly handling an improper input.

One measure of test code effectiveness is 'coverage' or the degree to which a source code or program is tested. One simple measure is the percentage of executable blocks or commands of the application code that is executed by the test code. Other measures may include function coverage, statement coverage, branch coverage, and condition coverage. These measures are often used during application code development to measure the suitability of the application code for publication and shipment.

SUMMARY

A test environment may include qualitative evaluations of the test code used to test application code. Several qualitative evaluations may be determined from analysis of test code in compiled or source form, including evaluating descriptive assertions made by the test code, dependency evaluations, cyclomatic complexity evaluations, return value assertions, mutable parameter assertions, and test effectiveness history. The qualitative evaluations may also include analysis of the test code in relation to the application code, including exception capturing, boundary conditions, assertions for returned values, and other evaluations. The test code evaluations may be presented in a user interface along with the test code and may be used to measure quality of the tests performed against source code. The test code evaluations may be integrated into a code development application with a graphical user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A system for testing application code may evaluate test code to determine qualitative metrics for the test code. The qualitative metrics may give a simple assessment of the effectiveness of the test code in a more useful manner than conventional test coverage analysis. The system may automatically evaluate the test code by source code analysis and analysis of compiled or intermediate code, and may use several rules that may identify the 'quality' of the test code.

In an application development environment, test code may be automatically generated from the application code or manually authored as unit tests. The test code may be further modified and edited by an application developer or test engineer to have various assertions and to cover different scenarios. Each of the unit tests may be displayed within the application development environment with a qualitative icon or other display that shows the quality level of the test code component. When test code is executed against the application code, the results of the tests may be displayed with a qualitative metric that may be derived from the quality of the test code.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
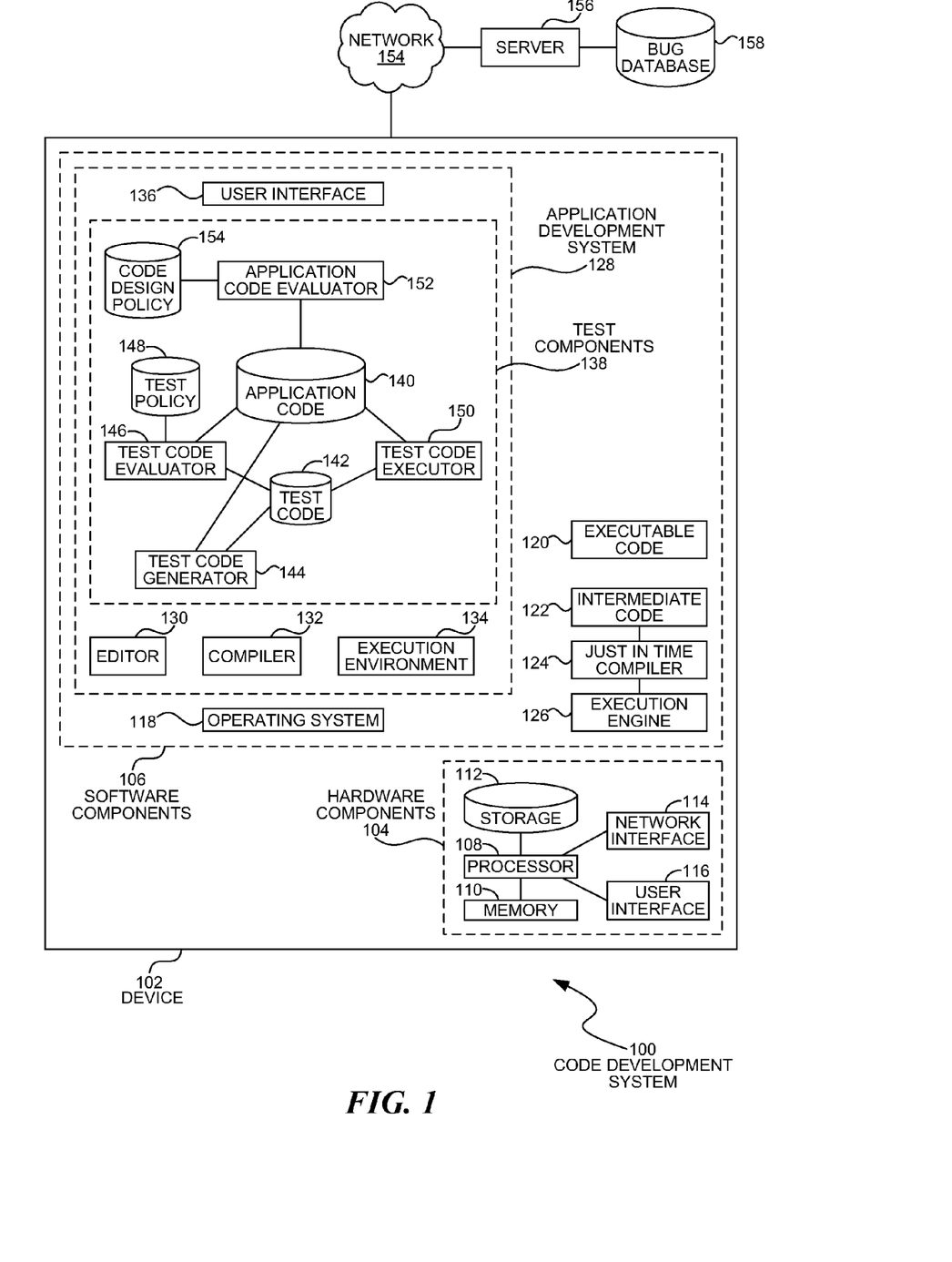
FIG. 1 is a diagram illustration of an embodiment showing an environment in which a test code evaluation system may operate.

FIG. 1 is a diagram of an embodiment 100, showing a system code development. Embodiment 100 is a simplified example of a device that may be used to write, edit, test, and debug computer executable code.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a system that may be used to develop software, firmware, or other executable code. The final product developed on the system of embodiment 100 may be known as application code. Application code, as used in this specification and claims, is a software product that is tested by test code. Test code, as used in this specification and claims, is software that exercises the application code. In general, test code does not ship with the application code and is not used when the application is executed.

The software development system may be used to generate test code, and then the test code may be automatically evaluated to determine qualitative metrics for the test code. In many cases, the test code may be manually authored and then evaluated to generate qualitative metrics. The analysis of the test code may determine various features or aspects of the test code so that a qualitative metric can be established.

The qualitative metric may be used to determine how 'good' the test code is, using various analyses that may be performed on the test code. The qualitative metric may be used to identify portions of the test code that may have deficiencies and to give some measure of assurance in the test results.

For example, test code that scores high on the analyses may be given a high qualitative metric. The results of the test code, when executed against the application code, may be considered as a good representation of the application code quality. Conversely, the results of test code that has a poor qualitative metric may be questionable.

The device 102 may be a general purpose computer that has hardware components 104 and software components 106. The device 102 may have several tools that may be used to develop application code and may be used by programmers or application developers.

In some embodiments, the device 102 may be similar to the device on which an application may be intended to be executed. As such, the device 102 may represent a personal computer or other similar device.

In other embodiments, the device 102 may be a development platform for software or firmware that may be executed on a different device. For example, the device 102 may be used to develop and test software that may be executed on another type of computer device, such as a cellular telephone or other device with a computer processor. In such embodiments, the device 102 may include a simulator or emulator that mimics the operations of the intended device. Such a simulator may allow the application code to be tested and executed prior to installing and running on the intended device hardware.

The hardware components 104 may include a processor 108 that may use random access memory 110 and nonvolatile storage 112. The hardware components 104 may have a network interface 114 as well as a user interface 116.

In the example of embodiment 100, the hardware components 104 may represent a general purpose personal computer. In other embodiments, the hardware components 104 may be a desktop computer or server computer. Some embodiments may be a portable device such as a laptop computer, netbook computer, or even a cellular telephone, personal digital assistant, or other device.

The software components 106 may include an operating system 118 on which several different types of software may operate.

Executable code 120 may be any type of code that is directly executable within the operating system. In some instances, executable code 120 may be machine code that may include commands directly executable by the processor 108. In other instances, the executable code 120 may be assembly code that is executed after being processed by an assembler.

Some software components may be defined using intermediate code 120. Intermediate code 120 may be source code that is compiled into an intermediate representation, and then may be further compiled using a just in time compiler 124 and executed by an execution engine 126. Intermediate code 122 may be useful in managed code applications or where several different programming languages may be used.

An application development system 128 may have many of the elements used for writing, editing, testing, debugging, and publishing an application. In the example of embodiment 100, the features of the application development system 128 may be illustrated as part of a large application or programming environment in which a programmer may perform many different operations in a single application. In other embodiments, the various components described may be separate applications that are executed independently.

In some embodiments, portions of the application development system 128 may be performed by other devices. For example, a server device may be used to compile code into executable code. In another example, another device may be used to execute application code and test code. Such an example may be for a device that has a specialized processor or hardware for which application code may be intended.

Many embodiments of an application development system 128 or the various components within the application development system 128 may have a graphical user interface. The graphical user interface may be used to browse through code, write and edit code, and select from many different functions of the various components.

In some embodiments, some or all of the portions of the application development system 128 may be executed using a command line or other interface.

Many application development systems 128 may have an editor 130, a compiler 132, and an execution environment 134. The editor 130 may allow a user to view, write, and edit code, including application code and test code. The compiler 132 may compile source code into executable code that may be executed using the execution environment 134.

The execution environment 134 may be similar to running compiled code in an operating system environment. The execution environment 134 may include certain debugging and tracing functions that may provide detailed information about the executing code that may not be available in an operating system environment.

A group of test components 138 may be used to develop and test application code 140. The test components 138 may include various components to create and analyze test code 142. The test code 142 may exercise the application code 140 to uncover any defects in the application code 140 and to ensure that the application code 140 performs as expected.

Some embodiments may have a test code generator 144 which may create various test code elements from the application code 140. For example, the test code generator 144 may create unit tests that may cause commands or functions within the application code to be exercised. A unit test may exercise a small portion of the application code 140, such as a short function, subroutine, or an individual command.

In some embodiments, the test code generator 144 may create portions of test code that may be modified or changed by a programmer to fully exercise the portion of application code. In such embodiments, the test code generator 144 may create the shell of a test, such as a unit test, and a programmer may perform some edits or write a short portion of test code to complete the test.

The test code 142 may include unit tests which may test an isolated portion of the application code 140. In large applications, there may be many hundred or even thousands of unit tests created to test the various portions of an application. A unit test may ensure that small portions of the application code 140 perform as intended and may operate within a single class and without external components.

The test code 142 may include integration tests which may various software modules or components within the application code 140 may be combined and tested as a group. Integration tests may test large subsets of the application code 140 in a single test. In many cases, multiple integration tests may be created to test different use scenarios or test cases. Integration tests may include testing communication between processes, among other things.

The test code 142 may also include system tests, which may test the application code 140 as a single unit. The system tests may exercise the application code 140 in various use scenarios as a high level. Many such tests may treat the application code 140 as a 'black box', providing inputs and expecting certain outputs. The system tests may include performance testing, functional testing, error handling testing, load testing, stress testing, reliability testing, recovery and failover testing, and many other types of testing.

The test code 142 may be tailored to the type of application code 140. One example may be software that operates in an aviation computer in an airplane. Such software may operate where human lives may be at stake, the test code 142 may be very elaborate and rigorous. In another example, a simple game application may have certain quality standards that a game manufacturer may wish to maintain before shipping. In still another example, a software application that handles health records or other personal information may be rigorously tested for security.

A test code evaluator 146 may analyze the test code 142 using a test policy 148 to determine a qualitative assessment of the test code 142. The test code evaluator 146 may analyze the test code 142 for assertions, descriptions within the assertions, cyclomatic complexity, dependencies, and other factors. From these and other analyses, a qualitative test code health metric may be created for individual tests as well as for the entire test code 142.

The qualitative test code health metric may be displayed with each of the individual tests within the test code 142. The health metric may be used to indicate which tests meet the standards defined in the test policy 148 and which tests may not. Those tests that do not meet the standards may be flagged for improvement or further development.

The test policy 148 may define best practices or test standards that may be used during the development of the application code 140. The test policy 148 may define certain rules that are applied by the test code evaluator 146 to determine if the test code 142 complies with the best practices.

In some embodiments, the test policy 148 may include several sets of rules that address various test standards. The rules may be selectable by a programmer so that the programmer may focus on certain aspects of the test code 142. For example, a programmer may select assertion related tests and may de-select other metrics. In such a case, the test code evaluator 146 may analyze the test code 142 for the subset of tests that apply to assertions while not analyzing for other types of potential problems.

A set of test policies 148 may be created for different types of application software being developed and for a programming team's or company's internal management. The test policies 148 may define the various characteristics of test code with which the test code evaluator 146 may verify compliance. In some cases, different types of application code 140 may determine the test policy 148.

The application code 140 may be evaluated in a similar manner as the test code 142 by the application code evaluator 152. A code design policy 154 may describe the analyses performed by the application code evaluator 152 against the application code 140.

The application code evaluator 152 may examine the application code 140 to determine compliance with the code design policy 154. The code design policy 154 may include policies relating to how the application code 140 may be constructed, such as defining modularity policies, commenting and documentation policies, examination of input and output parameters of functions, and many other types of analyses.

In some embodiments, the test code evaluator 146 and application code evaluator 152 may be the same application or executable code, but may use the test policy 148 and code design policy 154 to perform different types of checks and analyses against the test code 142 and application code 140, respectively.

The output of the test code evaluator 146 and application code evaluator 152 may be combined to produce qualitative metrics for test results. For example, the completeness or coverage of a set of test code may be determined by analyzing the functions in the application code 140 and matching the functions with test code 142 to determine if all of the application functions have matching test routines.

In another example, the test results produced by the test code 142 may be qualified by the quality of the test code 142. For example, test code that has a poor qualitative test code health metric may adversely affect an overall assessment of the application code. In the example, a poorly constructed test code 142 executed against application code 140 may generate test results. The test results may be displayed alongside the qualitative test code health metrics which may indicate that the test code 142 does not meet the basic standards defined in the test policy 148. Such an indication may negate the test results. Conversely, a positive qualitative test code health metric may give high credibility to the test results.

The test code executor 150 may execute the test code 142 against the application code 140 to generate test results. Some embodiments may execute the test code in a manner that includes various debugging features that may gather various monitoring information during the test execution. The debugging features may be turned on and off within the application development system 128 and may or may not be present when the application is executed outside the application development system 128.

In some embodiments, the test results may be stored in a bug database 158 that may be reached through a network 154 and may be located on a remote server 156. The bug database 158 may capture any failures or problems that result from the test code executor 150. The bug database 158 may have a mechanism for identifying bugs within the application code 140 and tracking the fixes to the bugs. Such a system may be used to manage the code development project for the application code 140 and may be useful when managing a team of programmers working on different sections of the application code 140.

Figure 5:
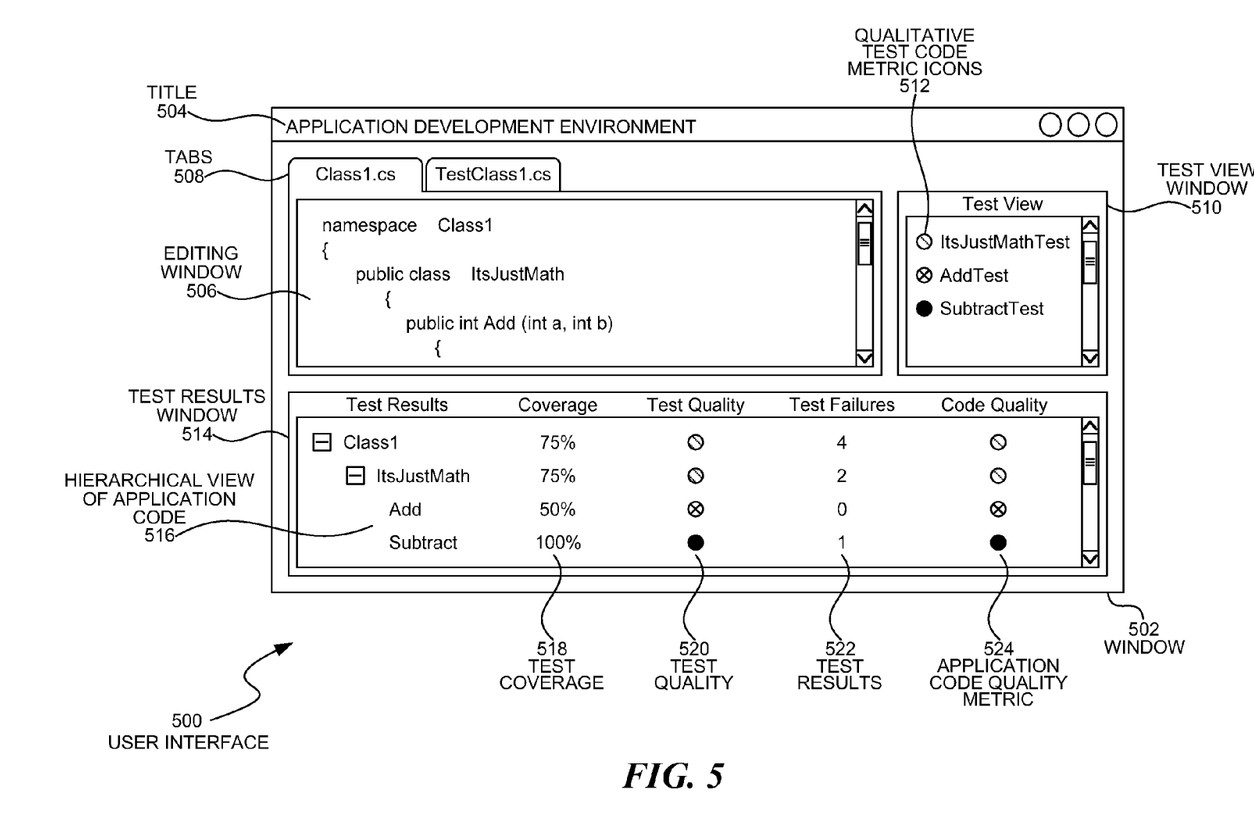
FIG. 5 is a diagram illustration of an embodiment showing a user interface with test code analysis results.

The application development system 128 may include a user interface 136 that may be used to display the qualitative test code health metrics, along with other qualitative metrics. An example may be illustrated in embodiment 500 presented later in this specification.

Figure 2:
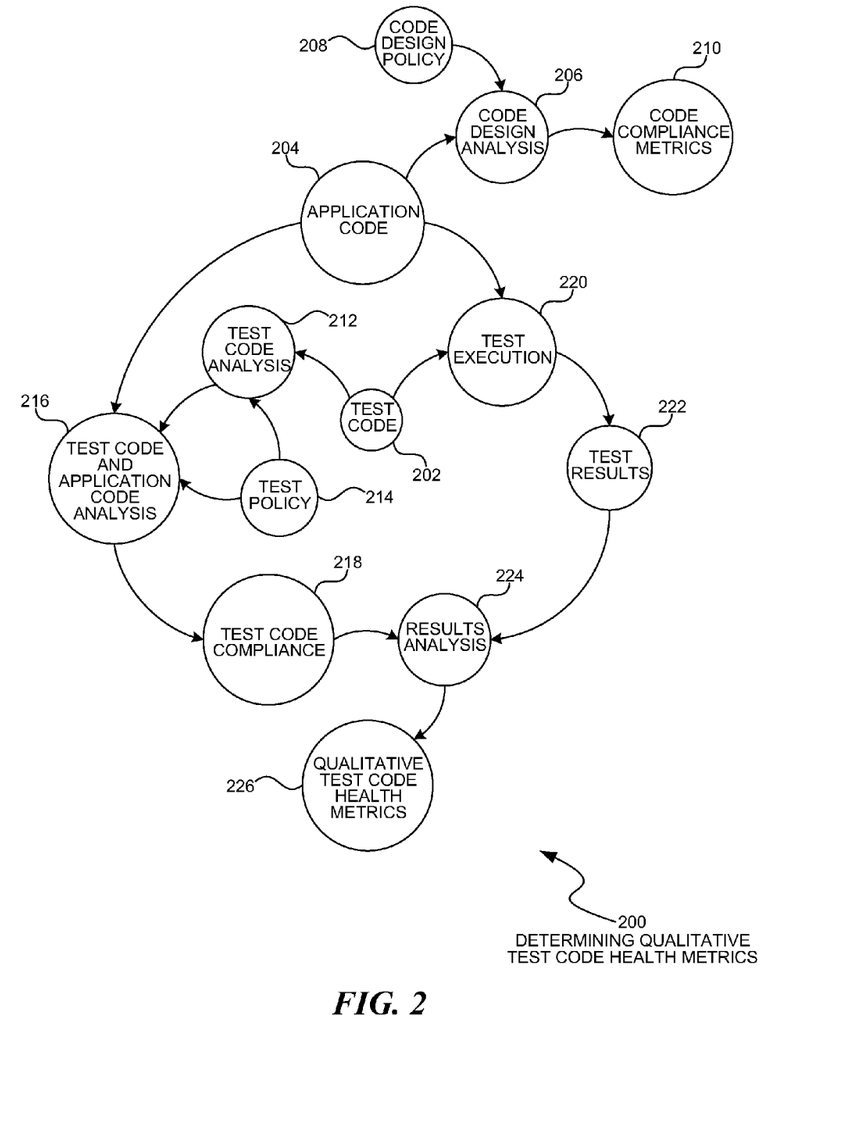
FIG. 2 is a diagram illustration of an example embodiment of qualitative test code health metrics.

FIG. 2 is a diagram of an embodiment 200, showing a sequence for analyzing test code and application code to generate qualitative test health code metrics. Embodiment 200 is a general overview of a methodology that may be used to analyze application code and test code, then analyze both together, and finally analyze test results to determine qualitative measures of the test code.

The test code 202 and application code 204 may be tested at any point during the application code development. In many cases, the process of embodiment 200 may be performed many hundreds or thousands of times during the development of the application code 204. In very complex applications, the process of embodiment 200 may consume a long period of time and may be performed, for example, each evening after a day of code development.

In many cases, the process of embodiment 200 may be performed on a small portion of an application, such as a portion that may be under development by a single programmer or a small team of programmers. In such cases, the process of embodiment 200 may be performed relatively quickly and may be used to generate qualitative test code health metrics on a periodic basis to assist a developer in creating the test code to test the application code.

The application code 204 may be analyzed using a code design analysis tool 206 that uses code design policy 208. The analysis may check the application code 204 for compliance with various design practices so that the code may be maintainable, readable, and may follow various functional design standards. The result of the analysis may be a set of code compliance metrics 210.

The test code 202 may be similarly analyzed by a test code analysis tool 212 that may use a test policy 214. The test policy 214 may analyze the test code 202 for compliance with test code standards, which may be different from the code design standards defined in the code design policy 208.

In particular, the test code analysis tool 212 may evaluate the test code 202 for assertions and descriptions associated with the assertions. Additionally, the test code may be analyzed for cyclomatic complexity and excessive dependencies.

The test code analysis tool 212 may evaluate the test code 202 as source code or compiled code. In some cases, the compiled code may be intermediate code.

An additional analysis may be performed using both the test code and application code in block 216. This analysis may also use the test policy 214 and may identify features in the application code 204 to determine if those features are covered by portions of the test code 202. The output of the analysis of block 216 is test code compliance.

The test code 202 may be executed against the application code 204 by a test executor 202 to produce test results 222. A results analysis 224 may be performed and using the test code compliance 218, generate qualitative test code health metrics 226.

The operations of embodiment 200 are merely one method by which qualitative test code health metrics can be generated. Qualitative test code health metrics may be generated by the test code analysis 212 and may be reflected in the test code compliance 218. In some embodiments, these additional qualitative test code health metrics may be captured, stored, and displayed to a user. In other embodiments, a set of summary metrics may be generated, as reflected in the qualitative test code health metrics 226.

Figure 3:
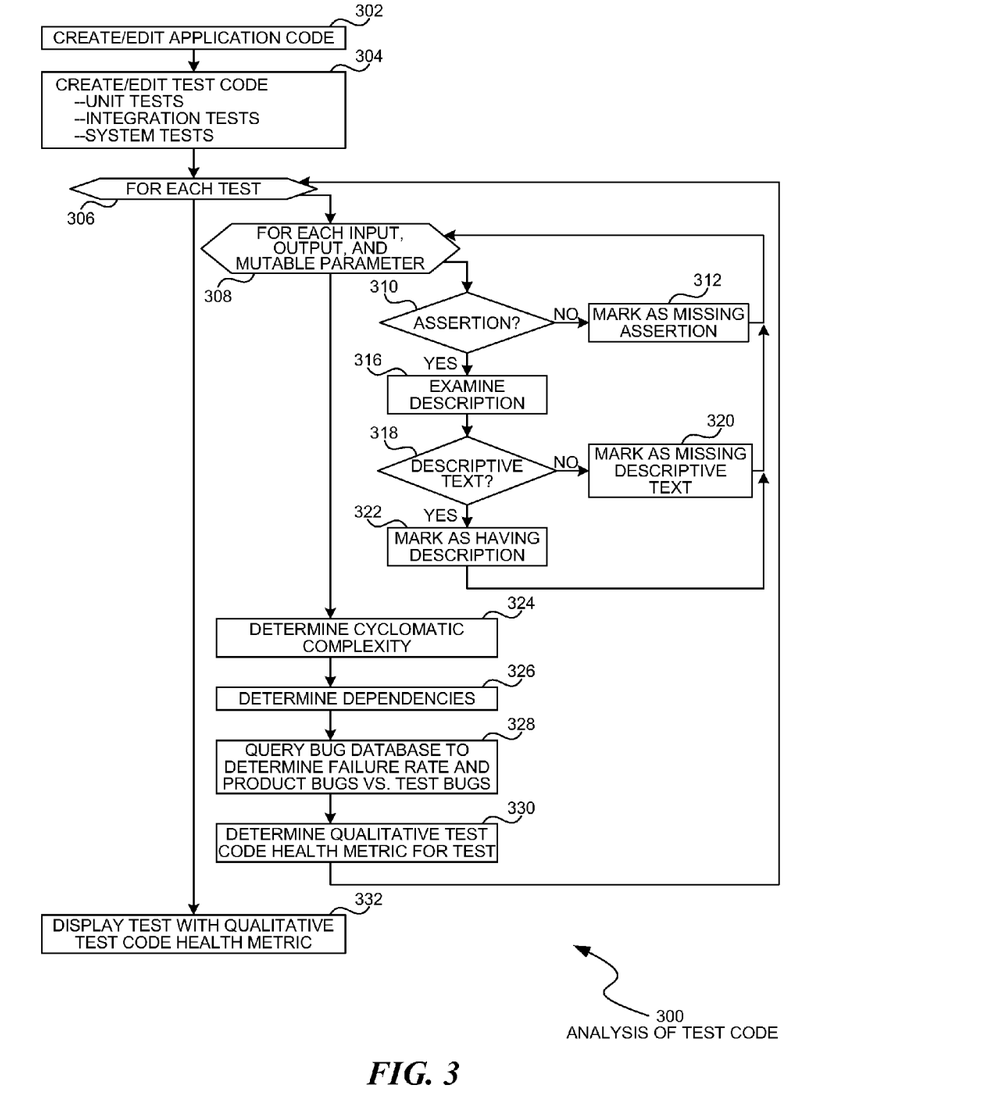
FIG. 3 is a flowchart illustration of an embodiment showing a method for analyzing test code.

FIG. 3 is a flowchart illustration of an embodiment 300 showing a method for analyzing test code. Embodiment 300 is an example of a method that may be performed by a test code evaluator, such as the test code evaluator 146 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a more detailed illustration of the analyses that may be performed on test code. The analyses of embodiment 300 are similar to the analyses illustrated in embodiment 200, but may be illustrated in a different sequence.

In block 302, application code may be developed.

Test code may be developed in block 304 to perform various tests on the application code. The test code may include unit tests, integration tests, system tests, and any other type of test. Each test may be analyzed in block 306.

Each input, output, and mutable parameter within the test code is analyzed in block 308.

If there is no assertion for the parameter in block 310, the test is marked as missing an assertion in block 312.

The description of the assertion is examined in block 316. If the description does not contain descriptive text in block 318, the test may be marked has missing descriptive text in block 320. The descriptive text may be simply determined by examining a test to determine if the assertion description is different from an automatically generated assertion description that may be the default description. Such a change may indicate that a human programmer may have modified the description.

In some embodiments, the descriptive text may be verified by determining that certain keywords are present, that the text contains at least a minimum number of words, that the description is different from any other description in the test, or other criteria.

The test may be evaluated for cyclomatic complexity in block 324. Cyclomatic complexity may be a measure of the number of independent paths through the test's source code. Tests with high cyclomatic complexity may indicate higher complexity and possibly less reliability than tests with low cyclomatic complexity. Higher cyclomatic complexity may indicate that the test code may be more difficult to maintain and may be less resilient to outside changes.

The test may be evaluated for dependencies in block 326. Tests with high numbers of dependencies may be less reliable than tests with fewer numbers of dependencies.

In block 328, a bug database may be queried to determine failures detected by the current test. The bug database may return the total number of failures detected and whether those failures were determined to be problems in the application code or test code. A test that consistently returns failures in the application code and few or no failures in the test code may have a high confidence.

In block 330, a qualitative test code health metric may be created for the test. The qualitative test code health metric may be determined by a set of rules, an algorithm, or other mechanism to evaluate the presence of assertions, quality of assertions, cyclomatic complexity, dependencies, and usage history. In many cases, the qualitative test code health metric may be a simple "high", "medium", or "low" confidence. Other embodiments may use a scale with more or fewer values.

The qualitative test code health metrics may be displayed alongside the tests in block 332 in a user interface. The qualitative test code health metric may give a developer a simple indicator that can be used to identify tests that may be substandard.

Figure 4:
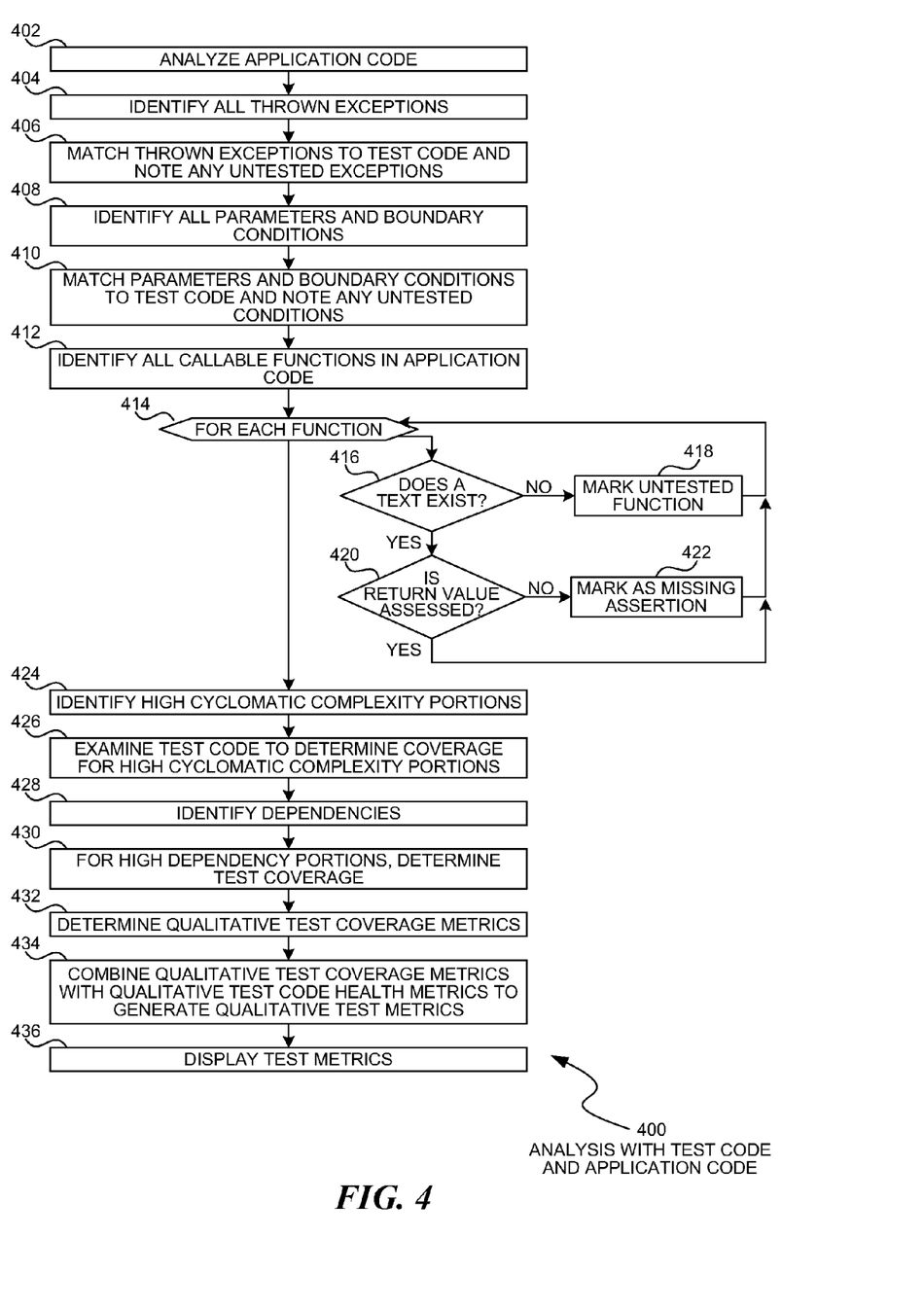
FIG. 4 is a flowchart illustration of an embodiment showing a method for analyzing test code with application code.

FIG. 4 is a flowchart illustration of an embodiment 400 showing a method for analyzing test code in light of application code. Embodiment 400 is an example of a method that may be performed by a test code evaluator, such as the test code evaluator 146 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates some analyses that may be performed to determine qualitative metrics based on the application code in addition to the test code. Embodiment 400 may be a continuation of embodiment 300 in some instances.

In block 402, the application code may be analyzed. In block 404, all exceptions that may be thrown by the application may be identified, and in block 406, the thrown exceptions may be matched to the test code and any untested exceptions may be noted.

In block 408, all parameters for functions may be identified and all boundary conditions for those functions identified. In block 410, the parameters and boundary conditions may be matched to the test code and any untested parameters or boundary conditions may be noted.

In block 412, all callable functions in the application code may be identified. The functions are analyzed individually in block 414. In block 416, if a test does not exist for the function, the function is marked as untested in block 418. If the test exists in block 418 and the return value is not asserted in block 420, the function is marked as missing an assertion in block 422. If the test exists in block 416 and the return value is asserted in block 420, the process may return to block 414 to process another function.

Portions of the application code with high cyclomatic complexity may be identified in block 424. In block 426, the test code may be examined to determine if the test code exercises each independent path in that portion of the application code. Test code for high cyclomatic complexity application code may use a more thorough testing than other similar sized blocks of application code with lower cyclomatic complexity.

Dependencies of the application code may be identified in block 428. For the high dependency portions of the application code in block 430, the test coverage for those areas may be determined.

All of the analyses of the application code and test code performed so far in embodiment 400 may be used to determine qualitative test coverage metrics. The qualitative test coverage metrics may be displayed alongside portions of the application code so that a programmer may quickly identify those areas of application code that may benefit from additional test code development.

In block 434, the qualitative test coverage metrics may be combined with the qualitative test code health metrics from embodiment 300 to generate qualitative test metrics. The qualitative test metrics may represent the overall 'health' of the test regime for the application.

The various test metrics may be displayed in block 436.

FIG. 5 is a diagram illustration of an example embodiment 500 showing a user interface. Embodiment 500 is merely one example of how qualitative metrics may be displayed in a user interface.

Embodiment 500 is an example of an application development system that may incorporate an editor, compiler, and test executor. Embodiment 500 may have a graphical user interface through which a programmer may write application code, create test code, and execute the test code against the application code to generate test results. The test results may be browsed, viewed, saved, and used to identify problem areas in the application code or test code. The qualitative metrics discussed in this specification may be displayed using icons in various places within the application development system.

A window 502 has a title 504 and several windows. An editing window 506 may contain code and may be used to write and edit application code and test code. One of a set of tabs 508 may be selected to open "Class1.cs" or "TestClass1.cs" in the example of embodiment 500.

A test view window 510 may display various test code elements. Along with the test code elements are qualitative test code metric icons 512 that may reflect the results of an analysis of the test code. In the example of embodiment 500, "SubtractTest" may be illustrated with a dark or green icon indicating a 'good' status. "AddTest" may be illustrated with an 'x' or red icon indicating a 'bad' status. "ItsJustMathTest" may be illustrated with a medium or yellow icon indicating a middle ground status. The "ItsJustMathTest" may be a class that contains "SubtractTest" and "AddTest", and the icon for "ItsJustMathTest" may reflect the summary status of the tests contained therein.

A test results window 514 may show the test results of the application code when the test code was executed against it.

Test results window 514 may contain a hierarchical view of application code in block 516, along with test coverage 518. The test coverage 518 may reflect how many blocks of application code were exercised by the test code when the test code was executed against it.

The test quality icons 520 may reflect the qualitative test code metrics for each set of tests executed against that portion of the application code. In some cases, the test quality icons 520 may represent the aggregation of several different test code components that were executed against the application code.

Test failures 522 may represent the number of failures encountered in the last run of the test code.

An application code quality metric 524 may be a qualitative application code health metric that combines the test results 522, test coverage 518 and test quality 520 to represent the current status of the application code.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An application development system operable on a computer processor, said application development environment comprising:
    a test code execution system that executes test code against application code to generate test results, said test code having a plurality of test code components, each of said test code components being separately executable;
    a test code evaluator that determines a qualitative test code health metric for each of said test code components, said test code evaluator evaluating assertion defined in said test code by:
        determining a block of application code covered by a first test code component;
        identifying each output from said block to determine a number of outputs;
        examining said first test code component to determine a number of assertions corresponding to said outputs;
        using said number of assertions and said number of outputs to determine a qualitative test code health metric;
    a user interface on which said test code components are displayed with an indicator for said qualitative test code health metric;
    a code editor capable of editing said test code and said application code; and
    an automated test code generator that examines said application code and generates at least a portion of said test code components.

2. The system of claim 1, said test code evaluator examining a dependency stack for said test code and generating a qualitative test code health metric at least in part from said dependency stack.

3. The system of claim 1, said test code evaluator determining a cyclomatic complexity for a first test code component and using said cyclomatic complexity at least in part to generate a qualitative test code health metric for said first test code component.

4. The system of claim 1, said test code evaluator further determining a test result metric comprising said test code health metric.

5. The system of claim 4, said test result metric being determined from test coverage and said test code health metric.

6. The system of claim 5, said test coverage comprising assertions for outputs from said application code.

7. The system of claim 6, said test coverage comprising exception handling for thrown exceptions from said application code.

8. The system of claim 7, said test coverage being displayed on said user interface with an indicator comprising a color corresponding to said test result metric.

9. A method performed on a computer processor, said method comprising:
    receiving application code to test;
    receiving test code designed to test said application code, said test code comprising unit tests for said application code;
    performing an automated evaluation of said test code to determine a qualitative test code health metric for each of said unit tests, by:
        determining a block of application code covered by a first test code component;
        identifying each output from said block to determine a number of outputs;
        examining said first test code component to determine a number of assertions corresponding to said outputs; and
        using said number of assertions and said number of outputs to determine the qualitative test code health metric; and
    displaying said qualitative test code health metric for each of said unit tests.

10. The method of claim 9 further comprising:
    generating a summary test code health metric based on each of said qualitative test code health metrics.

11. The method of claim 9 further comprising:
    executing said test code against said application code to generate test results; and
    displaying said test results along with said qualitative test code health metrics.

12. The method of claim 11, said test code further comprising integration tests.

13. The method of claim 12, said test code further comprising system tests.

14. An application development system operable on a computer processor, said application development environment comprising:
    an editor through which source code can be displayed;
    a compiler for compiling said source code into compiled code;
    an execution environment that executes said compiled code on said computer processor;
    a test code execution system that executes test code against application code to generate test results, said test code having a plurality of test code components, each of said test code components being separately executable, said test code components comprising unit tests;
    a test code evaluator that determines a qualitative test code health metric for each of said test code components by analyzing said test code components by:

determining a block of application code covered by a first test code component;

identifying each output from said block to determine a number of outputs;

examining said first test code component to determine a number of assertions corresponding to said outputs; and using said number of assertions and said number of outputs to determine a qualitative test code health metric; and a user interface on which said test code components are displayed with an indicator for said qualitative test code health metric.

15. The system of claim 14, said test code evaluator analyzing a source code version of at least one of said test code components.

16. The system of claim 15, said test code evaluator analyzing a compiled version of at least one of said test code components.

* * * * *